66-192 SR
7/1/86 OR H 000,090

United States Statutory Invention Registration [19]

[11] Reg. Number: H90

Kumar [45] Published: Jul. 1, 1986

[54] STITCH-BONDED SPLIT-FILM FABRIC

[76] Inventor: Vijayendra Kumar, 15 The Strand, New Castle, Del. 19720

[21] Appl. No.: 769,205

[22] Filed: Aug. 23, 1985

[51] Int. Cl.[4] ..... D04B 23/08
[52] U.S. Cl. ..... 66/192; 66/196
[58] Field of Search ..... 66/190–192, 66/193; 112/79 R, 410, 44

[56] References Cited

U.S. PATENT DOCUMENTS

| | | | |
|---|---|---|---|
| 3,649,427 | 3/1972 | Hughes | 66/192 X |
| 3,649,428 | 3/1972 | Hughes | 66/192 X |
| 3,769,815 | 11/1973 | Ploch et al. | 66/85 A |
| 4,277,527 | 7/1981 | Duhl | 66/191 X |

FOREIGN PATENT DOCUMENTS

| | | |
|---|---|---|
| 1437179 | 7/1973 | United Kingdom . |
| 2108045 | 5/1983 | United Kingdom . |

OTHER PUBLICATIONS

Product Licensing Index, "Research Disclosure, Stitch--Bonded Products of Continuous Filament Nonwoven Webs", p. 30 (Jun. 1968).

Bahlo, "New Fabrics Without Weaving", Modern Textile Magazine, Nov. 1965, pp. 51–54.

*Primary Examiner*—S. C. Buczinski
*Assistant Examiner*—Linda J. Wallace

[57] ABSTRACT

A stitch-bonded fabric having two split-film layers as a weft component and one split-film layer as a warp component held together by a stitching yarn is improved significantly in its performance as a primary backing for a tufted pile carpet by having a nonwoven sheet of continuous organic filaments attached to the warp component. In tufting, the nonwoven sheet becomes the back side of the backing.

8 Claims, 2 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

STITCH-BONDED SPLIT-FILM FABRIC

BACKGROUND OF THE INVENTION

1. Field of The Invention

This invention concerns an improved stitch-bonded fabric which includes a layer of a nonwoven fabric and layers of split polymeric films held together by a stitching yarn. The invention also concerns a tufted pile fabric in which the stitch-bonded fabric is a primary backing.

2. Description of the Prior Art

Stitch-bonded fabrics made from layers of oriented synthetic organic polymer films which have been split into ribbons or filaments are known. For example, such stitch-bonded fabrics having a warp layer and two weft layers of split film elements stitched together by yarn have been used commercially, particularly in East Germany. These fabrics are made from "Florofol" film, which is an oriented film of an 80/20 blend of polyester and low-density polyethylene polymers, available from Kombination Textima of Karl Marx Stadt, East Germany. However, several problems were encountered when attempts were made to use these stitch-bonded fabrics for backings of tufted pile carpets, especially when high speed tufting and closely spaced tuft rows were employed. The tufting operation often caused breakage of the stitches of the stitching yarn and excessive fibrillation of the split film elements, to such an extent that portions of the split film elements unraveled or projected from the back surface of the tufted material. As a result, a tufted material was produced that had poorer pile uniformity, weaker tuft bind, and less stability in a bias direction than were desired.

The manner in which a multi-needle "Mali" stitching machine can be used to make the above-described stitch-bonded split-film fabric is disclosed by Ploch et al., U.S. Pat. No. 3,769,815. Ploch et al., also discloses various other stitch-bonded layered structures, though none are suggested for any purpose related to carpet backings. For example, in column 5, lines 21–31, Ploch et al., discloses a stitch-bonded layered fabric which includes two split-film weft layers separated from a split-film warp layer by a nonwoven material.

The purpose of the present invention is to provide a means for overcoming, or at least significantly reducing, the problems encountered with the known stitch-bonded split-film fabrics used for primary carpet backings.

SUMMARY OF THE INVENTION

The present invention provides an improved stitch-bonded fabric of the type which includes a layer of nonwoven sheet and layers of split film of synthetic organic polymer. In the fabric, one split-film layer forms a warp component and two other split-film layers arranged in a zig-zag face-to-face relationship form a weft component. The warp and weft components are held together by parallel rows of stitches formed by a stitching yarn. The improvement of the present invention comprises the nonwoven sheet being composed essentially of continuous filaments of synthetic organic polymer and being attached to the warp layer to form an outer surface layer of the stitch-bonded fabric. In a preferred embodiment of the invention, the nonwoven sheet is attached to the split-film layers with the stitches of the stitching yarn. Preferably, the improved stitch-bonded fabrics include a carpet-backing tufting lubricant. In another embodiment of the invention, the nonwoven sheet layer and stitch-bonded split-film layers form a primary backing for a tufted pile fabric, with the sheet being attached to the stitch-bonded film layers by the pile yarns of the tufted fabric. When used for the primary backing of a tufted fabric, the nonwoven sheet of the stitch-bonded fabric preferably becomes the back side of the backing.

BRIEF DESCRIPTION OF THE DRAWINGS

The invention will be more readily understood by referring to the drawings in which.

DETAILED DESCRIPTION OF PREFERRED EMBODIMENTS

Figure 2:
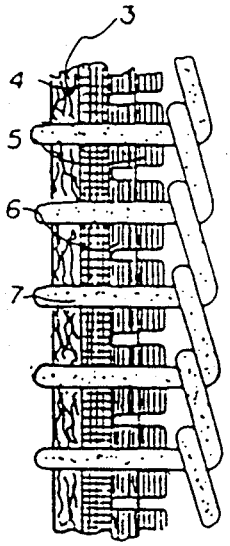
FIGS. 1 and 2 are schematic representations of cross-sections of a preferred stitch-bonded fabric of the invention.
Figure 1:
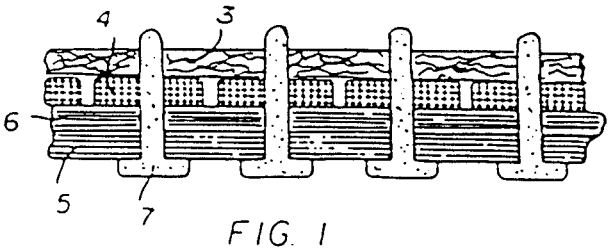

As shown in FIGS. 1 and 2, the basic structure of the preferred stitch-bonded fabric of the invention is a four-layer assembly comprising two weft layers 5, 6 of split film, one warp layer 4 of split film and one layer 3 of nonwoven sheet. The layer of nonwoven sheet is always an outer layer of the assembly and is always adjacent to the warp layer. Preferably, stitching yarn 7 holds the layers together and forms parallel chains of interlocked loops on one surface of the assembly and parallel series of zig-zag tricot stitches on the other surface. Such stitches are typical of those made by a two-bar "Mali" stitch-bonding machine.

The split-film layers generally can be made from any thermoplastic polymer which can be oriented sufficiently by stretching in one direction that when acted upon by the needles of a stitch-bonding machine, the films will split into ribbon or filaments. As is known, for example from Ploch et al., U.S. Pat. No. 3,769,815, the entire disclosure of which is hereby incorporated by reference, such polymers include polyolefins, polyesters, polyamides, polyacrylonitriles and the like. However, for the present invention, preferred oriented films are made of polyethylene terephthalate polymer or such polymer with up to 40% low density polyethylene. A particularly preferred oriented film is made from an approximately 80/20 blend of polyethylene terephthalate and low density polyethylene polymers. The major component, the polyester polymer, can conveniently be obtained from reclaimed polyester beverage bottles. Generally, the polyester component has an intrinsic viscosity (measured by the general method of ASTM-D-789) in the range of 0.5 to 1.0, at least 0.75 being preferred, and has no more than 50 carboxyl ends per 1000 kg of polyester (measured by the general method of *Analytical Chemistry, V.* 26, 1614 (October 1954). Each film layer for use in accordance with the present invention usually weighs in the range of 20 to 50 g/m$^2$, but film weights in the range of 25 to 40 g/m$^2$ are preferred.

The nonwoven sheet layer of the stitch-bonded fabric of the invention is made of continuous filaments of synthetic organic polymers. Sheets, such as those described in Kinney, U.S. Pat. No. 3,338,995 are among the types that are suitable. Spunbonded nonwoven sheets, such as Reemay ® spunbonded polyester (available from E. I. du pont de Nemours & Co.) are particularly useful. Preferred spunbonded sheets of continuous polyester filaments usually weigh in the range of 15 to 45 g/m$^2$ but most preferably weigh less than 25 g/m$^2$.

Generally, a wide variety of stitch-bonding yarns are suitable for use in the present invention. However, textured, multifilament polyester yarns have been found particularly useful. Yarns having a dtex in the range of 60 to 200 and containing between 20 and 50 filaments are suitable. However, yarns of other materials or yarns outside of these ranges of dtex and filament number also can be useful.

The preferred manner in which the stitch-bonded fabric of the invention can be made is by the general method described in Ploch et al., U.S. Pat. No. 3,769,815 (incorporated by reference hereinbefore). A "Mali" stitch-bonding machine is employed. The machine has two bars which can form series of tricot and chain stitches with stitching yarn. Oriented film, generally in the range of 25 to 30 cm wide, which is to provide the weft component of the final fabric, is supplied to the machine. The film is fed transversely to the operating direction of the machine and is folded in zig-zag fashion to form two face-to-face weft layers. The direction of molecular orientation of the film is also transverse to the operating direction of the machine. Another supply of the same type of film is fed in the operating direction of the machine. This film usually is in the range of 1 to 4 meters wide depending on the width desired in the final product. The warp film layer is brought into contact with the weft film layer. These three film layers can then be stitch-bonded together, by the needles of the "Mali" machine. The needles first penetrate the weft film layers, then the warp film layer, and then knit parallel series of two-bar chain-tricot stitches with supplied yarn. As a result of this operation, the films are split in the direction of their orientation into long ribbons or filaments and a stitch-bonded three-layer split-form product is formed. However, this product still lacks a distinctive feature of the present invention, namely the nonwoven sheet layer that must be attached face-to-face to the warp film layer.

To attach the nonwoven sheet to the warp film layer, in accordance with the preferred embodiment of the present invention depicted in FIGS. 1 and 2, the nonwoven sheet is fed to the "Mali" machine, parallel to the warp sheet and in such manner as to form an outer surface of the final stitch-bonded assembly. The penetration and splitting of the films as well as the stitching of all four layers together are then accomplished simultaneously by the method described in the preceding paragraph.

The total weight of the four-layer stitch-bonded fabric is generally in the range of 100 to 250 g/m$^2$, preferably 125 to 200 g/m$^2$.

When the stitch-bonded fabric of the present invention is to be used as a primary backing for a tufted pile fabric, the stitch-bonded three split-film layered structure of the art, described above, can be attached to the nonwoven sheet in another manner different from that described above. To accomplish the attachment, the nonwoven sheet is fed to the tufting machine such that the sheet is in contact with the warp layer of the stitch-bonded three split-film layer assembly. The nonwoven sheet and the three-layer assembly are then tufted with pile yarn. The tufting needles penetrate the nonwoven sheet first. The nonwoven sheet then becomes the backside of the backing of the pile fabric.

When the three film layers and nonwoven sheet are stitch-bonded simultaneously to form the preferred stitch-bonded fabric of the invention and then used as a primary backing for tufted pile fabric, the order in which the tufting needles penetrate the stitch-bonded layers is not as critical as with the structure described in the preceding paragraph. The tufting needles can enter the stitch-bonded fabric first through the weft film side or first through the nonwoven sheet. Nonetheless, it is believed and therefore preferred that better results and a somewhat better appearance are obtained when the tufting needles penetrate the nonwoven sheet first. Thus, it is usually preferred to make the nonwoven sheet the back side of the backing.

Before using the fabrics of the present invention as a primary backing for a tufted pile fabric, it is important that the backing be lubricated. Known carpet-backing lubricants are suitable, such as silicone lubricants (available from Dow Corning) or those disclosed by Jung, U.S. Pat. No. 3,322,607, Column 2, lines 21–36, which is hereby incorporated by reference. Without the lubrication, tufting is accompanied by broken stitch-bonding stitches, weaker fabrics, and excessive stretchiness in the tufted fabric, even when the nonwoven sheet is part of the stitch-bonded fabric. However, these shortcomings are substantially overcome when lubricated fabrics of the invention are employed as the backings. Conventional methods of applying the lubricants, generally in an amount of 1 to 5% by weight of the backing, are suitable. Application of the lubricant to only one surface of the backing, preferably to the surface of the nonwoven sheet, usually is adequate because the lubricant migrates well throughout the backing.

The following examples of preferred embodiments of the invention illustrate the advantages of the invention in tufted pile carpets.

EXAMPLES 1–3

In these examples, the product and process of the invention are illustrated with the manufacture of a four-layer stitch-bonded fabric and its use as a primary backing for a tufted-pile carpet. The stitch-bonded fabric was made up of three layers of split oriented film and one layer of a continuous filament spunbonded polyester nonwoven sheet. The film was a melt-extruded blend consisting essentially of 80% by weight of polyethylene terephthalate (instrinsic viscosity about 0.77 and less than 50 carboxyl ends/1000 kg) and 20% by weight of low density polyethylene. The film was oriented by uniaxial stretching immediately after extrusion. The film and the nonwoven fabric were supplied in different widths as wound-up rolls.

The film layers were fed to and assembled on a "Mali" stitch-bonding machine (MALIMO, type Malifol) by the general method of Ploch et al., U.S. Pat. No. 3,769,815. The weft layers were formed from the oriented film which was supplied from a roll that was about 30-cm wide. The 30-cm-wide film was fed by the machine transversely to the operating direction in zig-zag fashion and folded over after each trasverse to yield two weft layers in face-to-face zig-zag relationship. The weft layers were trasversed across the approximately 4.2-meter width beneath the edge gripping pins of the conveyor of the machine. The thusly formed and pinned weft layers were forwarded by the conveyor to a position at which they were brought into face-to-face contact with a single warp film layer. The warp layer consisted of three slightly overlapping, (by about 1–2 cm) side-by-side, 1.32-meter widths of the film fed from separate rolls and measured about 3.8-meters wide. A layer of continuous filament Reemay® Style 2250 spunbonded polyester nonwoven sheet was forwarded simultaneously from a roll to bring it into contact with the outer face of the warp film layer. The single layer of nonwoven sheet consisted of two, somewhat over-lapping, side-by-side widths of Reemay® which made up the full 3.8-meter width. The thusly assembled four layers were then penetrated from the weft side by the needles of the stitch-bonding machine, causing the films to split into long ribbons. Simultaneously, the layers of the assembly were stitched together in a conventional two-bar tricot-chain fashion with polyester yarn. Chains of interlocked loops were formed on one surface of the assembly and series of zig-zag stitches on the other surface.

Three examples of the invention (1–3) and one comparison sample were made in the above-described manner. In the comparison sample, the nonwoven sheet was omitted. The stitching yarn for Example 1 was a 150-denier, 34-filament textured polyester yarn and for Examples 2 and 3 and the comparison sample, a 75-denier, 25-filament flat polyester yarn. Weights of the various layers and yarns and strengths of the resultant fabrics are summarized in the table below.

The four stitch-bonded fabrics listed in the table were lubricated with a commercial silicone finish (sold by Dow Corning). The finish is one of the types described in Campbell et al., U.S. Pat. No. 3,867,188. The lubricant was applied by gravure roll and amounted to between 2½ and 3% by weight of the fabric.

The lubricated fabrics were then tufted on a ⅛-inch (0.32-cm) gauge, cut-pile tufting machine. A three-ply, bulked, continuous filament nylon yarn of 410 dtex was used as the pile yarn. Tufting gauge is 8 needles per inch (3.15/cm). The number of stitches was 33 per 10 cm and the stitching rate was 690 stitches per minute. Properties of the tufted carpet samples are also shown in the table below.

The tabulated results show that the stitch-bonded fabrics of the invention and the tufted pile carpets made with them were much stronger than the corresponding comparison sample. Furthermore, the tufted carpets in accordance with the invention exhibited better tuft bind and better dimensional stability than did the comparison sample. In addition, whereas the tufted carpet of the comparison sample had many portions of film ribbons protruding from its backing, the backings of the tufted carpets of the invention had no such defects.

TABLE

| | Example | | | Comparison |
|---|---|---|---|---|
| | 1 | 2 | 3 | Sample |
| A. STITCH-BONDED FABRIC | | | | |
| Unit Weight, g/m$^2$ | | | | |
| Two weft films | 65 | 66 | 75 | 71 |
| Warp film | 32 | 36 | 34 | 34 |
| Nonwoven sheet | 19 | 19 | 21 | 0 |
| Stitching yarn | 67 | 31 | 31 | 32 |
| Total | 183 | 152 | 161 | 137 |
| Standard Grab Tensile Strength*, Newtons | | | | |
| Weft direction | 316 | 329 | 409 | 183 |
| Warp direction | 498 | 409 | 401 | 254 |
| 45° bias | 530 | 320 | 383 | 307 |

TABLE-continued

| | Example | | | Comparison |
|---|---|---|---|---|
| | 1 | 2 | 3 | Sample |
| B. TUFTED-PILE CARPET | | | | |
| Tufted Grab Tensile Strength*, Newtons | | | | |
| Weft direction | 263 | 209 | 182 | 138 |
| Warp direction | 507 | 356 | 316 | 271 |

*measured as peak force in accordance with ASTM D-1117.

What is claimed is:

1. In a stitch-bonded fabric which includes a layer of nonwoven sheet and layers of split film of synthetic organic polymer, the split film providing one layer which forms a warp component and two layers arranged in zig-zag face-to-face relationship which form a weft component, the warp and weft components being held together by parallel rows of stitches formed by stitching yarn, the improvement comprising the nonwoven sheet being composed essentially of continuous filaments of synthetic organic polymer and being attached to warp layer to form an outer layer of the stitch-bonded fabric.

2. A stitch-bonded fabric of claim 1 wherein the nonwoven sheet and split film layers are held together by the stitching yarn stitches.

3. A stitch-bonded fabric of claim 1 or 2 wherein the parallel rows of stitches are chain-and-tricot two-bar stitches.

4. A stitch-bonded fabric of claim 1 or 2 wherein a carpet-backing tufting lubricant is included.

5. A stitch-bonded fabric of claim 1, wherein the fabric includes a carpet-backing tufting lubricant amounting to 1 to 5% by weight of the fabric, each split film layer is of a polymer consisting essentially of 60 to 100% polyethylene terephthalate and no more than 40% low density polyethylene and weighs in the range of 20 to 50 g/m$^2$, the nonwoven sheet consists essentially of polyester filaments and weighs in the range of 15 to 45 g/m$^2$, the stitching yarn is a multifilament polyester yarn having a dtex in the range of 60 to 200 and the stitch-bonded fabric weighs in the range of 100 to 250 g/m$^2$.

6. A stitch-bonded fabric of claim 2 wherein the fabric includes a carpet-backing tufting lubricant amounting to 1 to 5% by weight of the fabric, each split film layer is of a polymer consisting essentially of 60 to 100% polyethylene terephthalate and no more than 40% low density polyethylene and weighs in the range of 20 to 50 g/m$^2$, the nonwoven sheet consists essentially of polyester filaments and weighs in the range of 15 to 45 g/m$^2$, the stitching yarn is a multifilament polyester yarn having a dtex in the range of 60 to 200 and the stitch-bonded fabric weighs in the range of 100 to 250 g/m$^2$.

7. A tufted pile fabric wherein the stitch-bonded fabric of claim 2 or 6 is included as a primary backing.

8. A tufted pile fabric wherein the stitch-bonded fabric of claim 1 or 5 is included as a primary backing, the nonwoven sheet sheet of the fabric forming the back side of the backing and the tufted pile yarns attaching the nonwoven sheet to the stitch-bonded split-film layers.

* * * * *